(12) United States Patent
Münst et al.

(10) Patent No.: US 10,696,166 B2
(45) Date of Patent: Jun. 30, 2020

(54) ELECTRICALLY DRIVEN MACHINE WITH REVERSE POWER STORAGE

(71) Applicant: LIEBHERR-COMPONENTS BIBERACH GMBH, Biberach an der Riss (DE)

(72) Inventors: Thomas Münst, Ummendort (DE); Daniel Bayer, Giengen (DE)

(73) Assignee: Liebherr-Components Bieberach GmbH, Bieberach an der Riss (DE)

( * ) Notice: Subject to any disclaimer, the term of this patent is extended or adjusted under 35 U.S.C. 154(b) by 99 days.

(21) Appl. No.: 15/924,115

(22) Filed: Mar. 16, 2018

(65) Prior Publication Data

US 2018/0236878 A1    Aug. 23, 2018

Related U.S. Application Data

(63) Continuation of application No. PCT/EP2016/001556, filed on Sep. 16, 2016.

(30) Foreign Application Priority Data

Sep. 18, 2015  (DE) .................... 20 2015 006 587 U
Dec. 7, 2015   (DE) .................... 20 2015 008 403 U

(51) Int. Cl.
    *H02P 3/14*   (2006.01)
    *H02K 7/02*   (2006.01)
    (Continued)

(52) U.S. Cl.
    CPC .............. *B60L 11/16* (2013.01); *B60L 1/003* (2013.01); *B60L 7/10* (2013.01); *B60L 7/22* (2013.01);
    (Continued)

(58) Field of Classification Search
    USPC ........................................................ 318/376
    See application file for complete search history.

(56) References Cited

U.S. PATENT DOCUMENTS

2005/0235865 A1* 10/2005 Kumar ...................... B60L 9/16
                                                      105/61
2008/0121448 A1*  5/2008 Betz ......................... B60K 6/12
                                                      180/65.31
(Continued)

FOREIGN PATENT DOCUMENTS

CN       102171061        8/2011
DE      102008050553      4/2010
(Continued)

*Primary Examiner* — Jorge L Carrasquillo
(74) *Attorney, Agent, or Firm* — Levine Bagade Han LLP

(57) ABSTRACT

The invention generally relates to a machine with an electric drive and an energy storage system for the intermediate storage of recovered energy. The invention relates in particular to machines that function statically or quasi-statically with a primary electric drive and a secondary hydraulic drive that function in cyclical movements, such as in the form of a material-transferring device like an excavator or crane, having an electric drive with at least one electric motor for driving the drive train of the machine and with an energy storage system for the intermediate storage of reverse power released during towing and/or braking operation and transferred from the drive train to the electric motor. The invention also further relates to a method for operating a machine with an electric drive, in which energy recovered during a towing or braking operation is used to compensate for system losses or is stored temporarily. It is proposed that at least most of the energy transferred from the drive train back to the electric motor not be converted into electric energy, but rather that it be stored in the form of kinematic energy and that, to this end, the electric motor be put into a state with regard to its electromagnetic resistance and/or its (Continued)

torsional or drag torque in which the drag resistance or the electromagnetic torque of the motor is largely eliminated or at least significantly reduced relative to regular motor and/or generator operation.

16 Claims, 3 Drawing Sheets

(51) Int. Cl.
| | | |
|---|---|---|
| *E02F 9/20* | (2006.01) | |
| *B60L 11/16* | (2006.01) | |
| *E02F 9/22* | (2006.01) | |
| *B60L 7/22* | (2006.01) | |
| *B60L 50/30* | (2019.01) | |
| *B66C 13/28* | (2006.01) | |
| *B60L 1/00* | (2006.01) | |
| *B60L 7/10* | (2006.01) | |
| *B66C 13/22* | (2006.01) | |
| *B66C 23/40* | (2006.01) | |

(52) U.S. Cl.
CPC .............. *B60L 50/30* (2019.02); *B66C 13/22* (2013.01); *B66C 13/28* (2013.01); *E02F 9/207* (2013.01); *E02F 9/2217* (2013.01); *H02K 7/025* (2013.01); *H02P 3/14* (2013.01); *B60L 2200/40* (2013.01); *B60L 2240/421* (2013.01); *B60L 2240/423* (2013.01); *B66C 23/40* (2013.01)

(56) References Cited

U.S. PATENT DOCUMENTS

2015/0063968 A1    3/2015   Jacobson
2016/0375893 A1*  12/2016   Nefcy ................... B60W 20/14
                                                                  701/22

FOREIGN PATENT DOCUMENTS

| DE | 102010033234 | 2/2012 |
|---|---|---|
| GB | 2497956 | 7/2013 |
| WO | WO 2008/042319 | 4/2008 |
| WO | WO 2017/045760 | 3/2017 |

\* cited by examiner

ELECTRICALLY DRIVEN MACHINE WITH REVERSE POWER STORAGE

CROSS-REFERENCE TO RELATED APPLICATIONS

The present application is a continuation of International Application No. PCT/EP2016/001556, filed Sep. 16, 2016, which claims priority to German Utility Model Application Nos. 20 2015 006 587.2, filed Sep. 18, 2015, and 20 2015 008 403.6, filed Dec. 7, 2015, all of which are incorporated by reference herein in their entireties.

BACKGROUND

1) Technical Field

The invention generally relates to a machine with an electric drive and an energy storage system for the intermediate storage of recovered energy. The invention relates in particular to machines that function statically or quasi-statically with a primary electric drive and a secondary hydraulic drive that function in cyclical movements, such as in the form of a material-transferring device like an excavator or crane, having an electric drive with at least one electric motor for driving the drive train of the machine and with an energy storage system for the intermediate storage of reverse power released during towing and/or braking operation and transferred from the drive train to the electric motor. The invention also further relates to a method for operating a machine with an electric drive, in which energy recovered during a towing or braking operation is used to compensate for system losses or is stored intermediately.

2) Description of the Related Art

In material-transferring devices that function in cyclical movements, such as earth movers, mining excavators, crawler excavators, mobile harbor cranes, off-shore cranes, ship cranes or hydraulic cable excavators, it has long been conventional to use an engine-powered, especially a diesel-powered, primary drive that propels one or more hydraulic converters, by means of which hydraulic actuators are then powered and hydraulically driven in order to drive the main working unit and/or auxiliary working units. In an excavator, for example, these can be hydraulic cylinders for displacing the boom arm, rotary motors for rotating the upper carriage or a traction drive. In cranes, it is possible to drive hoisting winches, traveling trolley drives, derricking cylinders for derricking the boom arm, the slewing gear for turning the slewing platform or the rotatable crane part, or tensioning winches for displacing the anchoring in the aforementioned way.

If reverse power from one of the drive trains occurs in a machine of this type with a diesel-powered drive, the speed of the diesel engine is usually accelerated, wherein the returned energy is converted into heat in the diesel engine and distributed and/or emitted. A diesel engine is not susceptible in this regard and can systemically provide high braking torques (exhaust brake), and so further devices for distributing the reverse power are usually not required.

However, in machines driven by an electric motor where the motor is powered directly by the electrical supply network, this is not the case. Instead, when there is reverse power from one of the drives, the power flow reverses, i.e. the electric motor functions as a generator and power is fed back into the supply network. Strict regulations must be fulfilled in this instance, since the device is categorized as a power plant that generates electrical energy. Additionally, in electric motors that are supplied directly from the network, they can usually be operated only at a constant frequency, and so their speed is largely set. Variable-speed operation is not possible. The energy recuperated from these motors is network-asynchronous in frequency and phasing and thus cannot be fed back into the public network.

To mitigate this problem and bring about a decoupling from the supply network, the use of a frequency inverter that can be employed to regulate the speed of the electromotive drive has already been proposed in electric motor-powered machines of the aforementioned type. In the process, a braking mechanism is generally also provided, which comprises an electronic power switch, in particular in the form of a so-called brake chopper, and a power and/or braking resistor, in which the reverse energy is converted into heat and/or the reverse power can be dissipated. Therefore, the recovered or fed back energy cannot be used. The cooling system of the machine is also often heavily loaded, and so a cooling system that is oversized compared to normal operation is required, and this makes the machine heavier and creates space problems.

For this reason, the use of energy storage devices for the intermediate storage of recovered energy in hybrid drives that function with a primary electric drive and a secondary hydraulic dive has recently been proposed, wherein energy storage systems of this type can be configured as hydraulic accumulators, which store hydraulic energy, or as electric storage devices for storing electrical energy that is generated in the primary electric drive. For example, pressure accumulators such as bladder or piston accumulators can be employed to store hydraulic energy, or electrical storage devices such as double-layer capacitor storage devices or lithium batteries or other electrically chargeable storage devices, can be provided. However, energy storage systems such as these result in relative complex additional structures, which are expensive and significantly reduce the economic efficiency of the system when it is considered as a whole.

On this basis, the present invention addresses the problem of producing an improved machine of the aforementioned type and an improved method of the aforementioned type, which avoid the disadvantages of the prior art and develop the prior art in an advantageous way. In particular, an economical means for the intermediate storage of recovered energy transferred from the drive train to the electric motor should be achieved that permits the energy-efficient operation of the machine and requires less cooling.

SUMMARY

As claimed in the invention, the stated problem is solved by a method according to claim 1 and by a machine according to claim 3. Preferred configurations of the invention are the subject matter of the dependent claims.

It is thus proposed that at least most of the energy transferred from the drive train back to the electric motor not be converted into electric energy, but rather that it be stored in the form of kinematic energy and that, to this end, the electric motor be put into a state with regard to its electromagnetic resistance and/or its torsional or drag torque in which the drag resistance or the electromagnetic torque of the motor is largely eliminated or at least significantly reduced relative to regular motor and/or generator operation. For the intermediate storage of recovered energy, the motor does not function as a generator, but rather as a kinetic energy storage device or at least as a part of this kind of kinetic energy storage device. According to the invention, at least the electric drive for the intermediate storage of recovered energy that is transferred from the drive train to the electric motor is used as a flywheel storage system, wherein in particular an electromagnetic torque of the electric motor is controlled as a function of speed and is set to essentially zero in a storage system speed range above a nominal operating speed. Deactivating or significantly decreasing the electromagnetic torque of the electric motor does not result in feeding energy back onto the supply network, but rather in a mechanical and/or kinetic storage of the recovered energy.

Many problems and necessary measures related to electric recovery onto the supply network can be avoided in this way, in particular that it is not necessary to use expensive electrical storage devices such as lithium batteries or storage capacitors. The cooling system of the machine does not have to be designed for instances of energy recovery, but instead can have significantly smaller dimensions, since basically only the heat produced during normal operations has to be managed. At the same time, the energy that is intermediately stored kinetically can be reused to operate the working units of the machine without complex additional structures and without significant losses occurring. The friction losses that occur in the electric motor when it functions as a flywheel storage system are minute. It is possible to achieve considerably lower energy usage by the machine with a very simple drive structure and without costly additional components.

An especially simple design of the drive device and of the energy storage system can be attained when the rotor of the electric motor itself forms the flywheel storage system and no additional flywheels or storage components are coupled to the electric motor. In a further embodiment of the invention, the electric motor, in particular its rotor, can be dimensioned with regard to its rotary inertia and its maximum admissible speed above the nominal operating speed in such a way that the maximum reverse power that occurs during normal use can be stored entirely in the form of kinetic energy in the flywheel storage system.

When especially high amounts of recovered energy are to be saved by an electric motor with smaller dimensions, an additional flywheel mechanism can nevertheless be coupled to the electric motor, wherein a coupling can be provided between such an additional flywheel storage system and the electric motor to ensure efficient operation, and said coupling permits the additional flywheel mechanism to be coupled and uncoupled, such as decoupling during regular driving operation and coupling during recovery and storage operation.

Usually, however, the recovered energy from the electric motor and/or its rotor that occurs in generic machines can be intermediately stored only in the form of kinetic energy, and so the aforementioned flywheel storage system for the kinetic intermediate storage of recovered energy is formed by the electric motor alone or the mechanism of the flywheel storage system can be integrated entirely into the electric motor. The energy to be stored can be reduced significantly by using the recovered energy to compensate for a major portion of the systemic losses in the range of the storage system speed. These can be the towing capacity of the hydraulic assemblies, the driving power of hydraulically driven fans and/or the power loss of the driving motors (friction/fans).

The aforementioned decrease in the electromagnetic torque of the electric motor is advantageously implemented not only during towing and/or braking operation mode but also in a driving mode. The motor control device can keep the electromagnetic torque of the electric motor essentially at zero not only during the recovery of energy from the drive train to the electric motor but can also keep it essentially at zero when energy is again needed in the drive train and can be provided from the electric motor, which is functioning as a flywheel storage system, without the electric motor thereby needing to be electrically powered again.

In particular, the motor control device can keep the electromagnetic torque of the electric motor essentially at zero as long as the motor speed in the aforementioned storage device speed range is above the nominal speed. As soon as the speed exceeds the nominal operating speed during towing overrun or towing mode, the motor control device deactivates the electromagnetic resistance so that the electric motor does not function as a generator and it maintains this state until the speed is again reduced and reaches or falls below the nominal operating speed. As soon as the speed is below the nominal operating speed, the motor control device reactivates the electromagnetic torque of the motor so that the electric motor again functions as an electric motor and converts electrical power into mechanical power.

The aforementioned storage device speed range can advantageously have an upward limit in order to prevent the electric motor from exceeding a maximum allowable speed or the drive train from surpassing a maximum allowable velocity. In an advantageous development of the invention, the motor control device can set the electromagnetic towing and/or drag torque of the motor to a predetermined braking torque in a braking speed range above the aforementioned storage device speed range, in particular above a maximum allowable speed. In particular, the electric motor can function as a generator in said braking speed range, wherein the motor control device can advantageously be associated with an electronic power switch in the form of a braking chopper and/or a braking resistor, by means of which the electrical energy generated by the electric motor in the braking speed range can be dissipated and/or in which the electrical energy generated by the electric motor in the braking speed range can be converted into heat. However, an electrical braking mechanism such as this serves substantially as a redundant, additional safety brake, which can be dimensioned correspondingly small. The usual braking operation or towing operation that arises during normal operation of the machine is controlled by the use of the electric motor as a flywheel storage system, and the energy recovered in this way, which provided in the electric motor by the drive train, is kinetically stored intermediately.

The motor control device actuates the electromagnetic torsional and/or drag torque of the electric motor as a function of the speed, which can fundamentally be determined in various ways, such as being estimated, calculated or detected combinatorically on the basis of predetermined operating parameters. In a further embodiment of the invention, a speed detection device is provided for the detection of the rotary speed of the electric motor and/or of the drive train and/or of a connected working unit, wherein the motor control device controls the electromagnetic torque of the electric motor in response to the signal from the aforementioned speed detection device. For example, a speed sensor can directly detect the speed of an electric motor itself. Alternatively, the speed of the electric motor can also be determined only indirectly, such as by measuring the speed of the drive train that is coupled to the electric motor, possibly via a transmission, or by detecting the drive velocity of a working unit that is coupled to the drive train.

In a further embodiment of the invention, the motor control device can have a frequency inverter to actuate the electric motor and/or to control the electromagnetic torsional and/or drag torque of electric motor. The speed of the electric motor can be adjusted in driving operation mode using the aforementioned frequency inverter. Alternatively or additionally, the electromagnetic torque of the electric motor in the aforementioned storage device speed range can be reduced or set to essentially zero and raised back up to the aforementioned braking speed range by means of the frequency inverter. In principle, however, other electronic modules can also be used, by means of which the electromagnetic torque of the electric motor in the aforementioned storage device speed range can be reduced or set to essentially zero.

BRIEF DESCRIPTION OF THE DRAWINGS

Hereafter, the invention is explained in greater detail on the basis of a preferred embodiment and associated drawings. The drawings show.

DETAILED DESCRIPTION

Figure 1:
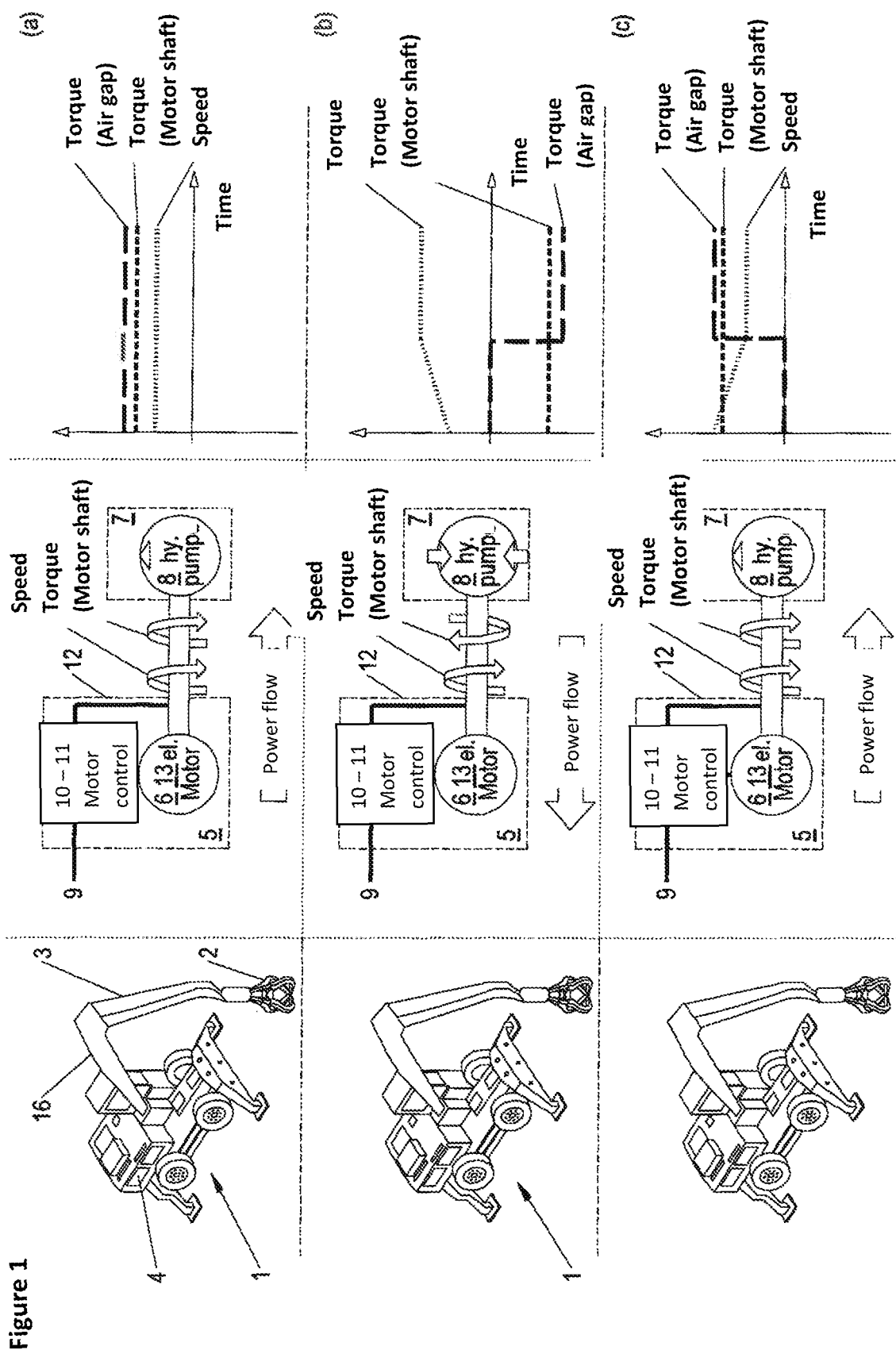
FIG. 1: a schematic, perspective representation of a machine in the form of a material-handling excavator, its directions of movement from rotation and torque and the power flow between an electric motor and a drive train that occurs in different operating states, wherein, supplemental to the representations of the power flow, the speed of the electric motor and its electromagnetic torque, which is controlled by the motor control device, are shown over time.

As FIG. 1 shows, the machine 1 can be configured in particular in the form of a material-transferring device that functions in cyclical movements and is preferably stationary or quasi-stationary, such as in the form of an excavator or a crane, wherein the drawing concretely shows an excavator with a gripping device 2 as its main working unit, which is articulated on the shaft of a boom arm 3, wherein said gripping device 2 can be moved and displaced by various hydraulic actuators. In a way that is known per se, gripper jaws of the gripping device 2 can be brought together and the gripping device 2 can be rotated and/or tilted relative to the shaft 3 by hydraulic control actuators and can be displaced by movements of the shaft 3 itself. The boom arm 16 is articulated on the upper carriage 4, which can be rotated about an upright axle relative to the lower carriage of the machine 1 by means of a slewing gear.

However, instead of the material-handling excavator shown, the machine 1 can also be configured in the form of another excavator, such as an earth mover, a mining excavator or a hydraulic cable excavator, but also in the form of a crane, such as a crawler excavator, a mobile harbor crane, an off-shore crane, ship cranes or a ship crane, or also in the form of another construction machine or material-handling machine that preferably functions in cyclical movements.

As FIG. 1 illustrates, the machine 1 comprises a primary electric drive 5, which has at least one electric motor 6 and drives one drive train 7, to which a secondary drive, in particular in the form of a hydraulic drive, can be connected. For example, a hydraulic converter can be connected in the form of a pump, such as an adjustable in-line piston pump or axial piston pump, but other converters and secondary drive units can also be provided. Said hydraulic converter of the hydraulic drive 8 can supply the aforementioned actuators with hydraulic pressure, such as in the form of hydraulic cylinders, so that the actuating movements of the machine can be carried out.

The electric drive 5 can be supplied with electric current and/or voltage from a power supply network 9, which is not shown in greater detail, wherein the power supply network 9 can be a fixed network, to which the excavator is linked by a cable, or a generator driven by an internal combustion engine or a sufficiently large battery or current accumulator or a combination thereof.

The electric motor 6 is actuated by a motor control device 10, wherein said motor control device 10 can have at least one frequency inverter 11. A speed detection device 12, e.g. in the form of a speed sensor, detects the speeds of the electric motor 6 and/or of the drive train 7 and provides a corresponding speed signal to the motor control device 10 so that the motor control device 10 can actuate the electric motor 6 via the frequency inverter 11 as a function of speed.

The electric motor 6 in this case is advantageously not operated at a constant frequency, as before, but can instead be accelerated up to a nominal operating speed $n_{Nenn}$ or up to a maximum allowable speed $n_{Max}$ and slowed down to a minimum speed $n_{Min}$, which can be greater than zero.

In a manner that is known per se, the electric motor 6 comprises a rotor which is not specifically shown and which can have relatively high inertia, the kinetic energy of which is yielded according to the following formula for an inert, rotating body:

$$E = \tfrac{1}{2} \cdot J \cdot \omega^2,$$

wherein E is the kinetic energy, J is the mass moment of inertia of the rotor and w is the angular velocity of the rotation of the rotor. As is known per se, energy is required to accelerate this rotor while, in contrast, energy is released when the rotation of the body is slowed.

As a result, the rotor of the electric motor 6 can be used as a flywheel storage system. No additional kinematic storage components are necessary, but one can nevertheless be provided and coupled to the electric motor. The energy storage device 13 for the intermediate storage of recovered energy from the drive system can be formed by the electric motor 6 and/or its rotor alone.

As FIG. 1 (a) shows, in the regular driving mode powered by external energy, i.e. fed from the power supply network 9, the power flow moving from the electric motor 6 to the drive train 7 is generated by the electric motor 6 in that the motor provides a positive torque and a positive speed. The electrical energy supplied from the supply network 9 is converted into said positive torque and the corresponding speed is converted by the electric motor 6, wherein the control is exerted in this case by the frequency inverter 11. This normal instance of driving always occurs when accelerating movements and/or working movements, during which the physical work is performed, are carried out. The electric motor 6 can function at a constant speed, which can measure 1800 U/min, for instance. The hydraulic converter of the hydraulic drive 8 is driven accordingly by the drive train 7 and the actuating movement is carried out.

Figure 2:
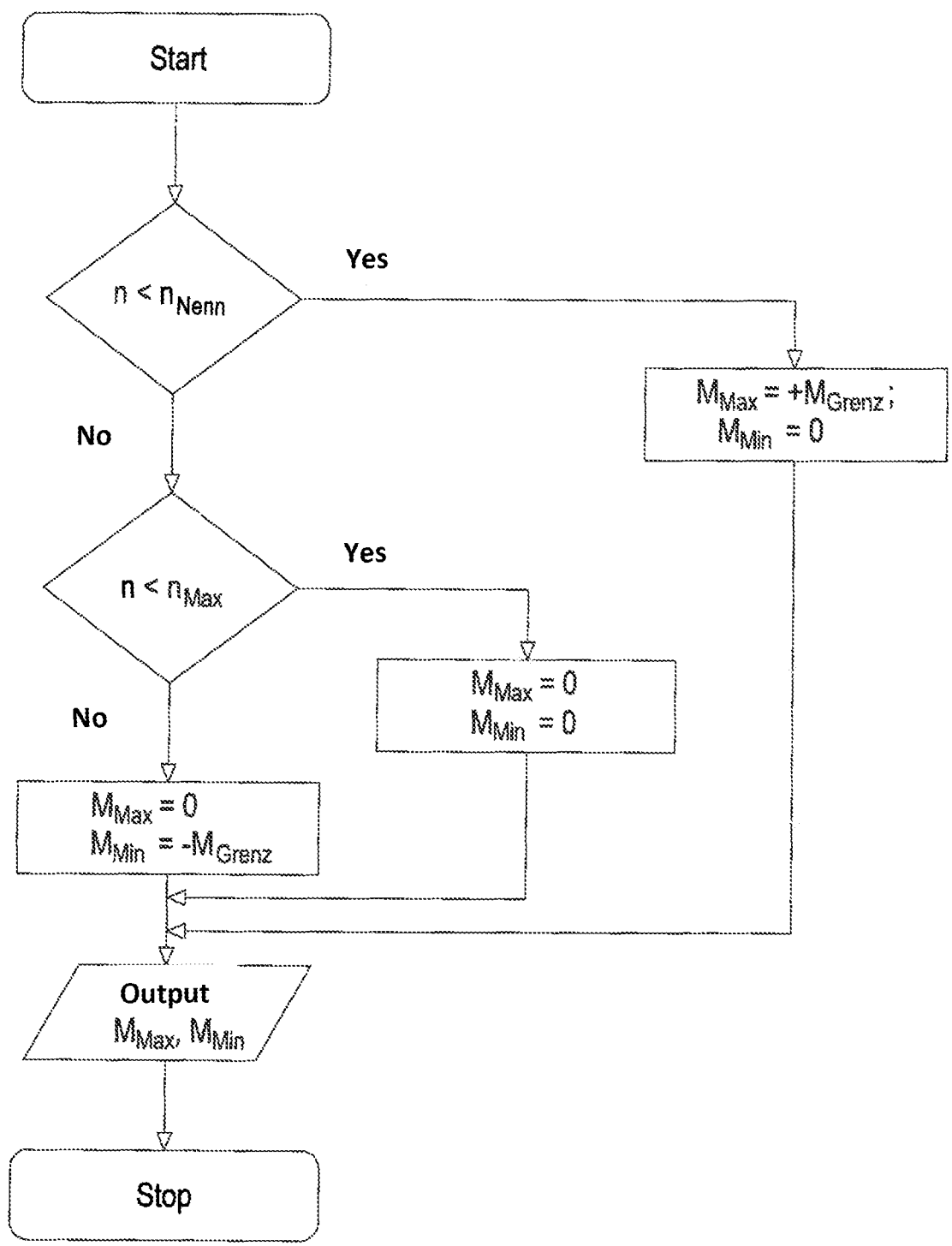
FIG. 2: a flow chart illustrate the operation of the motor control device, which controls the electromagnetic torque of the electric motor as a function of speed.
Figure 3:
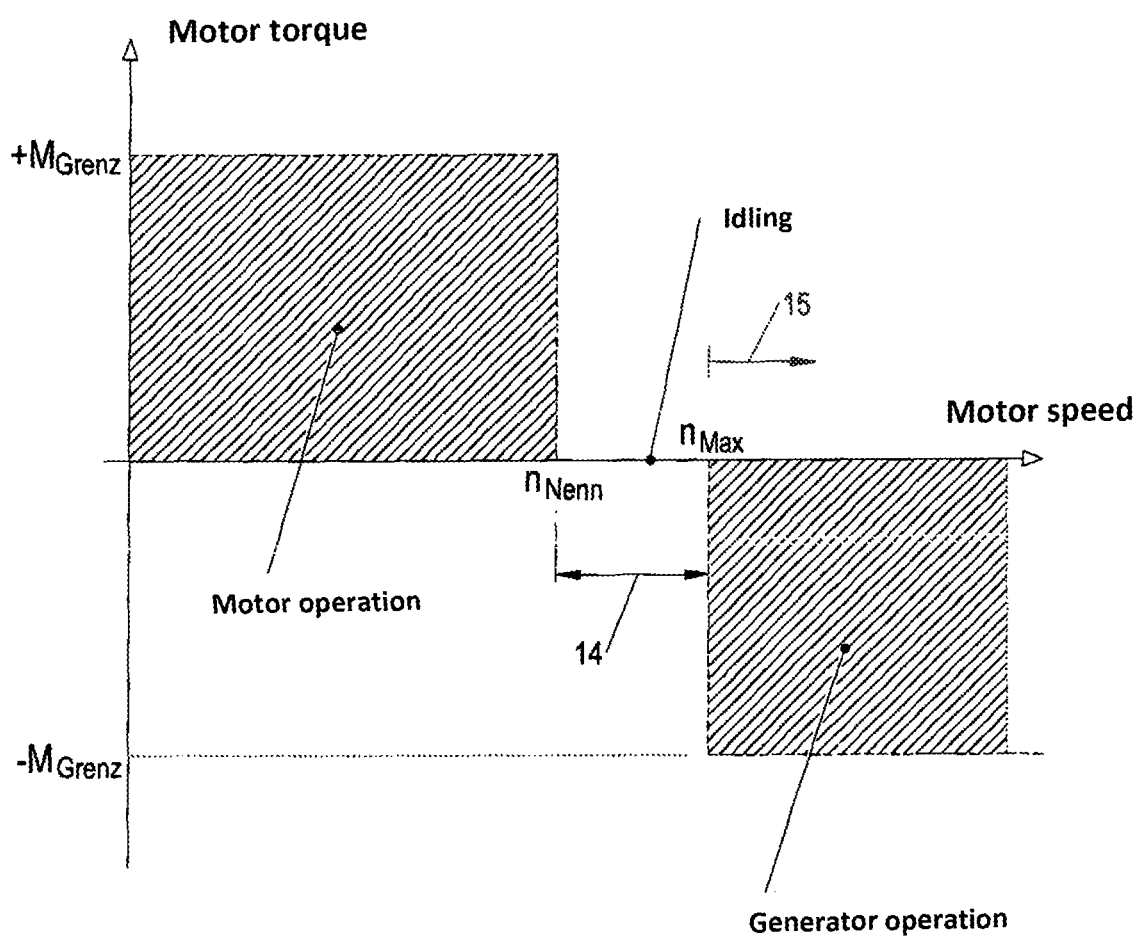
FIG. 3: a torque-speed diagram that illustrates the torque provided by the electric motor in the different speed ranges.

In the case of braking and/or towing movements, e.g. when the slewing gear slows down the upper carriage 4 or the boom arm 3 is lowered under the load of the gripping device 2, the torque on the drive train 7 and thus on the motor shaft of the electric motor 6 reverses, and mechanical power flows from the drive train 7 back into the electric motor 6; cf. partial view (b) in FIG. 1. In this towing and/or braking operation, the electric motor 6 is actuated and/or regulated by the motor control device 10 in such a way that the electric torque of the electric motor 6 is set at essentially zero as long as the nominal speed $n_{Nenn}$ is exceeded but a maximum speed $n_{Max}$ is not exceeded. As emerges from FIG. 2, the actual speed provided by the speed detection device 12 is compared with a predetermined nominal operating speed $n_{Nenn}$ and a likewise predetermined maximum allowable speed $n_{Max}$. If the actual speed is greater than the nominal operating speed $n_{Nenn}$ but below the maximum allowable speed $n_{Max}$, i.e. in a normal storage device speed range 14, which is identified in FIG. 3 as "idling", the electric motor 6 is operated without electromagnetic torque, i.e. it function neither as a motor nor as a generator and can rotate and accelerate essentially only by overcoming its very minor frictional torque and its inertia.

The energy to be stored can be reduced significantly by using the recovered energy to compensate for a major portion of the systemic losses in the range of the storage system speed. These can be the towing capacity of the hydraulic assemblies, the driving power of hydraulically driven fans and/or the power loss of the driving motors (friction/fans).

This means that, during the aforementioned towing and/or braking operation, the rotor of the electric motor 6 is accelerated as a result of the negative torque from the drive train 7, and the energy from the drive train 7 that is reversed into the electric motor 6 is converted and is then located in the rotation of the rotor of the electric motor 6, i.e. it is saved as kinetic energy of the rotor functioning as a flywheel storage system.

The inertia of the electric motor 6, in particular its rotor, and the rotation speed range between the nominal operating speed $n_{Nenn}$ and the maximum allowable speed $n_{Max}$ of the electric motor 6 are advantageously calculated such that the maximum possible energy that is fed back to the electric motor 6 from its power train 7 during normal operation of the machine 1 can be absorbed by the electric motor 5 and saved in the form of kinetic energy, without the electric motor 6 thereby experiencing excess rotational speed or the maximum allowable speed $n_{Max}$ being exceeded.

If the direction of the torque reverses again in the drive train 7 because, for example, an accelerating movement is supposed to be carried out or a load on the gripping device 2 should be lifted, then the energy kinetically stored in the electric motor 6 is used first to drive the drive train 7 accordingly. Before electric power is supplied to the electric motor 6 from the supply network 9 again, the rotor of the electric motor 6 is first slowed down again in order to utilize the intermediately stored kinetic energy from the flywheel storage system. In particular, the electric motor 6 is operated without a supply of electric power as long as the electric motor 6 is above its nominal operating speed $n_{Nenn}$. The electromagnetic torque of the electric motor 6 is kept at essentially zero by the motor control device 10 as long as the motor 6 is above the stated nominal operating speed $n_{Nenn}$; cf. FIG. 1, partial view (c).

If the power required in the drive train 7 persists such that the electric motor 6 is slowed to below the nominal operating speed $n_{Nenn}$, then advantageously the active driving power resumes from this point and electrical energy is supplied from the supply network 9. The motor control device 10 actuates the electric motor 6 accordingly via the frequency inverter 10 and it raises the electromagnetic torque again in order to be able to provide the driving power. The electric motor 6 then again generates a positive torque and supplies energy to the drive train 7 of the machine, as the partial view (c) of FIG. 1 shows per se.

As partial view (b) in FIG. 1 shows, the rising speed n during recovery operation with the electromagnetic torque of the electric motor 6 deactivated can be monitored by the speed detection device 12 and limited by the motor control device 10. In particular in cases when the maximum allowable speed $n_{Max}$ is reached, the motor control device 10 can again activate an electromagnetic torque on the motor so that the motor functions as a generator and provides a negative torque or drag torque; cf. FIG. 3: "Generator operation" and FIG. 1, partial view (b): the second part of the speed and torque progression with a constant speed and negative torque. The electromagnetic torque of the electric motor 6 in this instance is advantageously controlled by the motor control device 10 in such a way that exactly enough braking and/or drag torque is provided to keep the speed from overshooting the maximum allowable speed $n_{Max}$ and so that the motor rotates at the essentially maximum allowable speed $n_{Max}$.

The generator power of the electric motor 6 occurring in this case can advantageously be dissipated and converted into heat by an electronic power switch, for example in the form of a braking chopper and a power resistor and/or braking resistor, which is assigned to the motor control device 10. However, this electrical braking device needs to be provided merely for reasons of safety, in the sense of a redundant braking mechanism, and can be dimensioned accordingly small, since during normal operation the maximum speed is not exceeded and all of the recovered energy is stored intermediately as kinetic energy in the rotating rotor.

Advantageously, the motor control device 10 is configured such that reverse power into the supply network 9 is completely prevented. In this regard, regulations to this effect are insignificant.

We claim:

1. A method for operating a material-transferring device comprising an electric drive with at least one electric motor for driving a drive train, comprising:
   controlling an electromagnetic torsional or drag torque of the electric motor as a function of speed;
   setting the electromagnetic torsional or drag torque of the electric motor to zero in a storage device speed range above a nominal operating speed ($n_{Nenn}$), wherein a motor control device keeps the electromagnetic torsional and/or drag torque at zero in the storage device speed range both in a towing and/or braking operation mode, in which there is a power flow from the drive train to the electric motor, and in a working mode, in which there is a power flow from the electric motor to a power train;
   deactivating the electric motor to have zero electromagnetic resistance and zero electromagnetic torque when the electric motor rotates at an overspeed above the nominal operating speed, deactivating the electric motor independent of power flow, and rotating the electric motor at the overspeed without generating electromagnetic torque when the electric motor is deactivated; and
   immediately storing recovered energy that is recovered in the towing and/or braking operation and transferred from the drive train to the electric motor, wherein the electric motor is used as a flywheel storage system for the intermediate storage of the recovered energy when the electric motor is in the storage device speed range.

2. A material-transferring device that functions in cyclical movements, comprising:
- an electric drive having at least one electric motor for driving a drive train of the device and with an energy storage system for the intermediate storage of recovered energy that is recovered in a towing and/or braking operation mode and transferred from the drive train to the electric motor; and
- a motor control device for controlling the electromagnetic torsional and/or drag torque of the electric motor as a function of a motor speed, and wherein the motor control device is configured so the electromagnetic torsional and/or drag torque is set to 0 in a storage device speed range above a nominal operating speed ($n_{Nenn}$), wherein the motor control device keeps the electromagnetic torsional and/or drag torque at zero in the storage device speed range both in the towing and/or braking operation mode, in which there is a power flow from the drive train to the electric motor, and in a working mode, in which there is a power flow from the electric motor to a power train, wherein when the electric motor rotates at an overspeed above the nominal operating speed, the electric motor is deactivated independent of power flow to have no electromagnetic resistance and no electromagnetic torque, wherein when the electric motor rotates an the overspeed, the electric motor rotates without generating electromagnetic torque; and
- wherein the energy storage system has a flywheel storage system formed by the electric motor when the electric motor is in the storage device speed range.

3. The material-transferring device of claim 2, wherein the electric drive is connected with a hydraulic drive, which comprises at least one hydraulic converter that can be driven by the electric motor.

4. The material-transferring device of claim 3, wherein the flywheel storage system is formed by a rotor of the electric motor and/or the energy storage system is fully integrated into the electric motor.

5. The material-transferring device of claim 2, wherein the flywheel storage system is formed by a rotor of the electric motor and/or the energy storage system is fully integrated into the electric motor.

6. The material-transferring device of claim 2, wherein the electric motor is dimensioned with regard to a rotational inertia of its rotor and with regard to the rotation speed range between the nominal operating speed ($n_{Nenn}$) and a maximum allowable speed ($n_{Max}$) in such a way that the maximum recovered energy that occurs during normal use of the machine can be stored intermediately entirely in the form of kinetic energy in the electric motor.

7. The material-transferring device of claim 2, wherein the storage device speed range is upwardly limited to a maximum allowable speed ($n_{Max}$), and the motor control device sets the electromagnetic torsional and/or drag torque of the electric motor to a braking torque in a braking speed range above the storage device speed range.

8. The material-transferring device of claim 7, wherein the motor control device sets the electromagnetic torsional and/or drag torque of the electric motor to a braking torque in a braking speed range above the maximum allowable speed ($n_{Max}$).

9. The material-transferring device of claim 8, wherein the motor control device is associated with an electronic braking power switch and/or a braking resistor to dissipate the electrical energy generated by the electric motor in the braking speed range.

10. The material-transferring device of claim 9, wherein the electronic braking power switch comprises a braking chopper.

11. The material-transferring device of claim 7, wherein the motor control device is associated with an electronic braking power switch and/or a braking resistor to dissipate the electrical energy generated by the electric motor in the braking speed range.

12. The material-transferring device of claim 11, wherein the electronic braking power switch comprises a braking chopper.

13. The material-transferring device of claim 2, wherein the motor control device is configured to prevent recovery of electrical energy into a supply network to which the electric motor is connected.

14. The material-transferring device of claim 2, further comprising a speed detection device for the detection of the rotary speed of the electric motor and/or of a drive train and/or of a working unit connected to the drive train, and wherein the motor control device is configured to control the electromagnetic torsional and/or drag torque of the electric motor in response to a signal from the speed detection device.

15. The material-transferring device of claim 2, wherein the motor control device comprises a frequency inverter to actuate the electric motor and/or to control the electromagnetic torsional and/or drag torque of electric motor.

16. The material-transferring device of claim 2, wherein the material-transferring device comprises an excavator or a crane.

* * * * *